(12) United States Patent
McCracken et al.

(10) Patent No.: US 7,140,558 B2
(45) Date of Patent: Nov. 28, 2006

(54) MIXING ARRANGEMENT FOR ATOMIZING NOZZLE IN MULTI-PHASE FLOW

(76) Inventors: Thomas William McCracken, 8 Lotus Court, Gloucester, Ontario K1J 8A7 (CA); Adam J. Bennett, 2511 Innes Road, Ottawa, Ontario K1B 3K2 (CA); Kevin A. Jonasson, 1838 Summerlands Cr., Orleans, Ontario K1E 2Y2 (CA); Deepak Kirpalani, 47 Aird Place, Kanata, Ontario K2L 4C9 (CA); Zahra Tafreshi, 2399 Ogilvie Road, Ottawa, Ontario K1J 7N4 (CA); Terrence B. Base, deceased, late of London (CA); by Irene Base, legal representative, 104 Springfield Circle, London Ont. (CA) N6K 2T6; Douglas A. Emberley, 122 Cruikshank Road, Ft. McMurray, AB T9K 1L3 (CA); R. Douglas Kennett, 105 Ball Place, Ft. McMurray, AB T9K 2E2 (CA); Daniel J. Bulbuc, 198 McLaren Cr., Ft. McMurray, AB T9K 1J8 (CA); Edward W. Chan, 1582 Hector Road, Edmonton, AB T6R 2Z4 (CA)

( * ) Notice: Subject to any disclaimer, the term of this patent is extended or adjusted under 35 U.S.C. 154(b) by 248 days.

(21) Appl. No.: 10/807,511

(22) Filed: Mar. 24, 2004

(65) Prior Publication Data

US 2005/0001062 A1    Jan. 6, 2005

Related U.S. Application Data

(60) Provisional application No. 60/456,522, filed on Mar. 24, 2003.

(51) Int. Cl.
    *F23D 11/16* (2006.01)

(52) U.S. Cl. .............. 239/422; 239/432; 239/433; 239/434; 239/589; 239/590

(58) Field of Classification Search ............... 239/426, 239/432, 433, 434, 589, 590; 222/132, 145.1, 222/145.5, 145.6, 145.8
    See application file for complete search history.

(56) References Cited

U.S. PATENT DOCUMENTS 3,615,202 A * 10/1971 Stern et al. ............... 423/613

(Continued)

*Primary Examiner*—Justine R. Yu
*Assistant Examiner*—Trevor McGraw
(74) *Attorney, Agent, or Firm*—Jones, Tullar&Cooper, P.C.

(57) ABSTRACT

The invention relates to an improved mixing arrangement for, primarily, moving bitumen in steam from sources of such bitumen and steam to a reactor or coker for further processing of the bitumen into petroleum products. The invention provides a main conduit connected to an atomizing nozzle mounted in a wall of the reactor and first and second conduits for flowing bitumen and steam respectively into the main conduit. The first conduit is angled relative to the main conduit at an acute angle of about 45° and the second conduit is angled relative to the main conduit at an acute angle of about 30°. The second conduit is positioned upstream of the first conduit by a short distance of about 23 mm and may be angled radially relative to the first conduit by any angle, although a 90° angle is preferred. A flow accelerating nozzle is located in the second conduit adjacent the entrance therefrom into the main conduit The arrangement of the invention improves the flow characteristics of 2-phase material flowing to the atomizing nozzle, reducing pulsations in the main conduit and improving the resulting atomization of the bitumen in the reactor.

19 Claims, 2 Drawing Sheets

U.S. PATENT DOCUMENTS

| | | | |
|---|---|---|---|
| 4,264,212 A * | 4/1981 | Tookey | 366/3 |
| 4,306,961 A * | 12/1981 | Taciuk | 208/390 |
| 4,377,257 A * | 3/1983 | Geise | 239/419.3 |
| 4,648,920 A * | 3/1987 | Sperber | 156/62.2 |
| 4,768,710 A * | 9/1988 | Sperber | 239/8 |
| 4,913,648 A * | 4/1990 | Clavell | 431/13 |
| 4,961,882 A * | 10/1990 | Bhagat et al. | 261/124 |
| 5,129,583 A * | 7/1992 | Bailey et al. | 239/427 |
| 5,289,976 A * | 3/1994 | Dou et al. | 239/431 |
| 5,484,107 A * | 1/1996 | Holmes | 239/427.5 |
| 5,520,332 A * | 5/1996 | Gaidis et al. | 239/8 |
| 5,565,241 A * | 10/1996 | Mathias et al. | 427/196 |
| 5,618,001 A * | 4/1997 | Del Gaone et al. | 239/346 |
| 5,678,764 A * | 10/1997 | Kukesh | 239/399 |
| 6,003,789 A * | 12/1999 | Base et al. | 239/433 |
| 6,045,058 A * | 4/2000 | Dobbeling et al. | 239/11 |
| 6,093,310 A * | 7/2000 | Swan | 208/113 |
| 6,627,161 B1 * | 9/2003 | Radcliffe et al. | 422/139 |

* cited by examiner

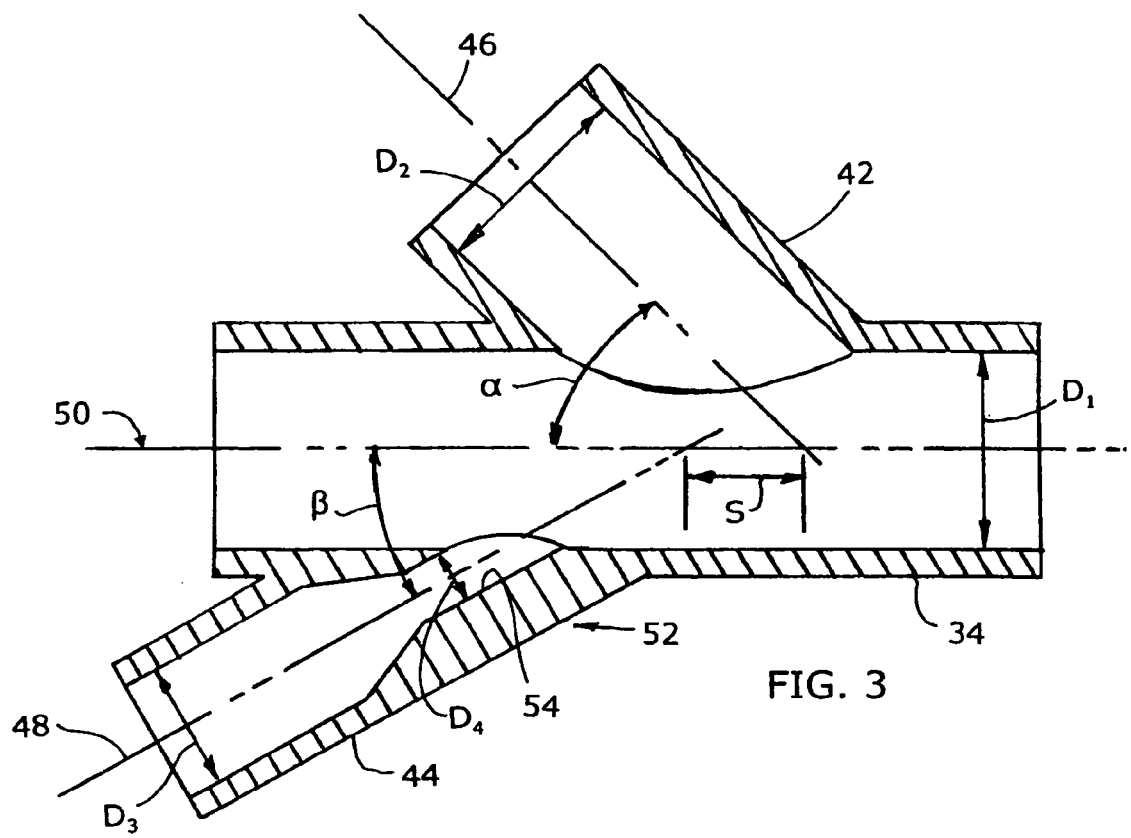
FIG. 3
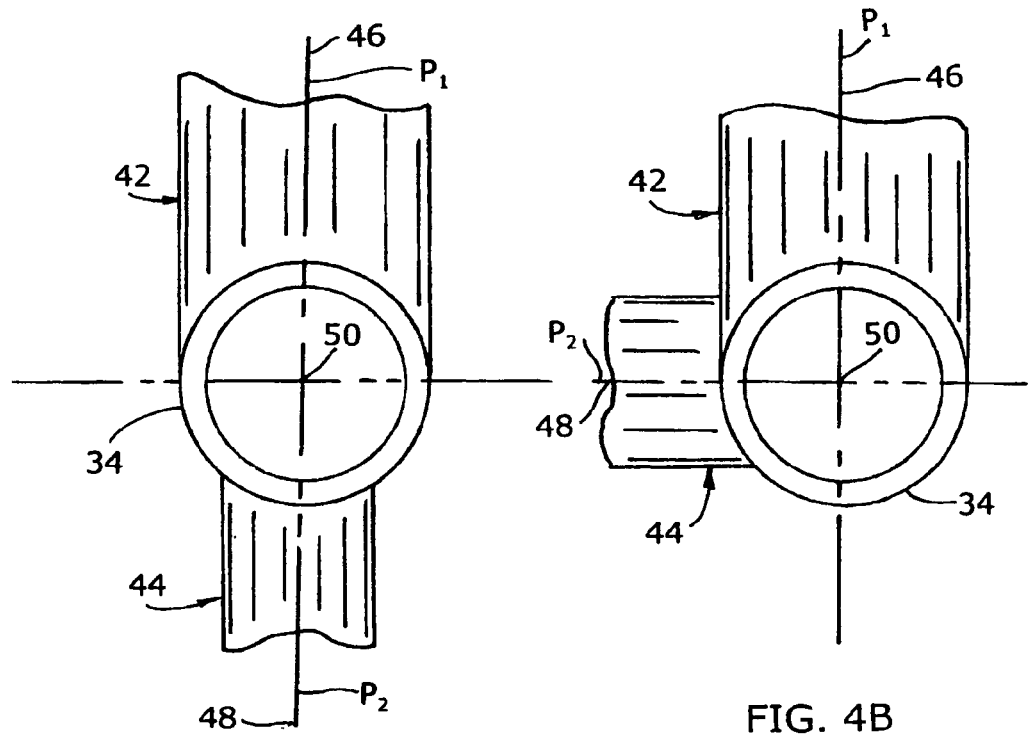
FIG. 4A
FIG. 4B

MIXING ARRANGEMENT FOR ATOMIZING NOZZLE IN MULTI-PHASE FLOW

This application claims the benefit of U.S. Provisional Application No. 60/456,522, filed on Mar. 24, 2003.

The present invention relates to a mixing assembly for an atomizing nozzle used in multi-phase flow and in particular to such an assembly that would be used with oil or bitumen and steam being fed to a coker.

BACKGROUND OF THE INVENTION

When bitumen or heavy oil is extracted from tar sands it is not initially in condition for further processing into usable petroleum products. Usually the bitumen is processed in a reactor or a coker, in which atomized droplets of the bitumen in a carrier such as steam are heated to produce low-boiling petroleum products. The efficiency of the coking process is enhanced if the bitumen droplets are of a uniform small diameter, of the order of 300 µm. In a typical installation the bitumen is introduced into a flowing stream of high pressure steam and preferably is broken down into bubbles or particles as the 2-phase mixture of bitumen and steam flows along a mixing apparatus which then pass through an atomizing nozzle into the interior of the reactor or coker for further processing therein.

One installation for achieving atomized bitumen in steam is found in U.S. Pat. No. 6,003,789. It uses a mixing assembly or apparatus as is illustrated in FIG. 1 therein, wherein an atomizing nozzle 20 is mounted in the wall of the reactor, a cylindrical conduit 24 is attached to the nozzle and a pair of parallel conduits 25 and 26 are provided for introducing steam and bitumen respectively into the main conduit 24, conduit 26 being downstream of conduit 25. It will be noted that the conduits 25 and 26 meet the conduit 24 generally at right angles with respect thereto. A flow-accelerating nozzle 22 is provided in the conduit 24 between the junctures of the steam and bitumen conduits 25 and 26 with the conduit 24. The nozzle 22 is intended to increase the flow velocity of the steam to improve break-up of the bitumen into bubbles or droplets. A valve is shown at the end of the conduit 24 opposite the atomizing nozzle 20 and upstream of the steam conduit 25, for use in introducing a cleaning rod into the conduit 24. The rod is used to clear blockages within the conduit 24 and the atomizing nozzle 20. It will be apparent that the minimum orifice size of the nozzle 22 cannot be less than the diameter of the cleaning rod, since the nozzle 22 is located within the main conduit 24. Otherwise, the cleaning rod could not pass along the full length of the main conduit. This places a limitation on the efficiency of the entire apparatus.

The above installation is an improvement over previous installations but it is not without its faults, occasioned primarily by the manner in which the conduits 24, 25 and 26 are arranged relative to each other. There are problems with flows because of the 90° relation between the conduit 24 and each of the conduits 25 and 26. Furthermore, there are problems in arranging the conduits in and around the reactor due to the relative positioning of the various conduits.

SUMMARY OF THE INVENTION

The present invention is intended to overcome the problems associated with the mixing arrangement of the above-identified U.S. patent. This is achieved through re-aligning the bitumen and steam conduits so that they meet the main conduit at acute angles with respect thereto and by removing the flow-accelerating nozzle from the main conduit. There is a smoother transition of bitumen and steam as these products pass from their respective conduits into the main conduit. Also, with the present invention the flow-accelerating nozzle is moved to the steam conduit and is located therein close to the point at which that conduit meets the main conduit, such that the steam is already accelerating as it enters the main conduit rather than after entering as with the prior art. There is a dramatic improvement in flow characteristics with the mixing arrangement of the present invention as compared to the prior art and the resultant atomized bitumen that enters the reactor is more easily processed into appropriate petroleum products than with the apparatus of the prior art.

The present invention, like the prior art, utilizes the formation of small bubbles of gas (steam) to carry the liquid phase (bitumen) to the atomizing nozzle. The present invention will enhance the formation of bubbles in such multi- or 2-phase flow. Specifically, with the arrangement of the present invention there is enhanced formation of bubbles less than 2 mm in diameter that are evenly distributed within the flow downstream of the point at which the gas and liquid phases are mixed. By providing a "bubbly flow" with this arrangement, the liquid is dispersed and is more easily atomized than with other types of 2-phase flow, such as slug or annular flow. The bubbles of gas in the liquid enhance downstream atomization through the exit orifice by the nature of the gas phase compressibility. By producing a uniform distribution of fine bubbles in the flow, the liquid is broken down into small webbed or ligament structures that are more easily broken into droplets when the gas decompresses at the nozzle exit. The uniformity of bubble distribution within the liquid ensures a near constant (with respect to time) gas-to-liquid mass ratio thereby giving consistent atomization (or droplet size). The flow has a minimal pulsing in it, thereby minimizing variations in the atomization over any period of time. This is in contrast to other designs of 2-phase flow mixing devices that may or may not produce a bubbly flow. For example, if there is a slug type flow, a large variation (with time) of the gas-to-liquid mass ratio at the nozzle tip can result, causing significant degradation in atomization efficiency.

It may be noted that the present invention was developed for applications in which a low gas-to-liquid mass ratio is used, to minimize costs for compressible gas phase use. Typically, the present invention works well for gas-to-liquid (GLR) mass ratios of 0.5% or higher. In actual tests, the GLR has been used as high as 1.5% without encountering a change to slug flow.

In summary of the above, the present invention may be considered as providing an arrangement for feeding a mixture of bitumen and steam to a reactor for further processing of atomized bitumen within the reactor comprising: an atomizing nozzle connected to a wall of the reactor and opening to an interior of the reactor, the nozzle being adapted to atomize bitumen carried by steam into droplets suitable for such further processing; a main conduit having a main axis, connected at a proximal end to the nozzle and including openable closure means at a distal end thereof, a first feed conduit having a first axis and connected to a source of bitumen, the first conduit being in a first plane containing the main and first axes, the first feed conduit joining the main conduit at an angle in the range of 30° to 60° as defined between the main and first axes upstream of the junction between the main and first conduits; a second feed conduit having a second axis and connected to a source of steam, the second conduit being in a second plane containing the main and second axes, the second feed conduit joining the main conduit upstream of the junction between the main and first conduits at an angle in the range of 20° to 40° as defined between the main and second axes upstream of the junction between the main and second conduits; and flow-accelerating nozzle means positioned in the second feed conduit upstream of the juncture between the main and second conduits.

The present invention may also be used with oil and steam processing equipment and can be used with existing atomizing nozzles already provided within a reactor. Thus the present invention may also be considered as providing a mixing arrangement for feeding a mixture of oil and steam to an atomizing nozzle connected to a reactor for further processing therein, comprising: a main conduit having a main axis, for connection at a proximal end thereof to the nozzle and including openable closure means at a distal end thereof; a first feed conduit having a first axis and connected to a source of oil, the first conduit being in a first plane containing the main and first axes, the first feed conduit joining the main conduit at an angle in the range of 30° to 60° as defined between the main and first axes upstream of the junction between the main and first conduits; a second feed conduit having a second axis and connected to a source of steam, the second conduit being in a second plane containing the main and second axes, the second feed conduit joining the main conduit upstream of the junction between the main and first conduits at an angle in the range of 20° to 40° as defined between the main and second axes upstream of the junction between the main and second conduits; and flow-accelerating nozzle means positioned in the second feed conduit upstream of the juncture between the main and second conduits.

The invention furthermore can be used with liquid processing equipment in which a heavier, incompressible, fluid is carried by a lighter, compressible, fluid to a location for further processing. Such invention thus may be considered as providing a mixing arrangement for feeding a mixture of a heavier, generally incompressible, fluid and a lighter, compressible, fluid to a location for further processing therein, comprising: a main conduit having a main axis, for connection at a proximal end thereof to processing apparatus at the location; a first feed conduit having a first axis and connected to a source of the heavier fluid, the first conduit being in a first plane containing the main and first axes, the first feed conduit joining the main conduit at an angle in the range of 30° to 60° as defined between the main and first axes upstream of the junction between the main and first conduits; a second feed conduit having a second axis and connected to a source of the lighter fluid, the second conduit being in a second plane containing the main and second axes, the second feed conduit joining the main conduit upstream of the junction between the main and first conduits at an angle in the range of 20° to 40° as defined between the main and second axes upstream of the junction between the main and second conduits; and flow-accelerating nozzle means positioned in the second feed conduit upstream of the juncture between the main and second conduits.

BRIEF DESCRIPTION OF THE DRAWINGS

FIG. 3 is an enlarged cross-sectional view of the mixing arrangement of the present invention at the junctions of the bitumen and steam conduits with the main conduit.

FIGS. 4A and 4B show by way of end views two of many possible relationships among the conduits of the mixing arrangement.

DESCRIPTION OF THE PREFERRED EMBODIMENT

Figure 1:
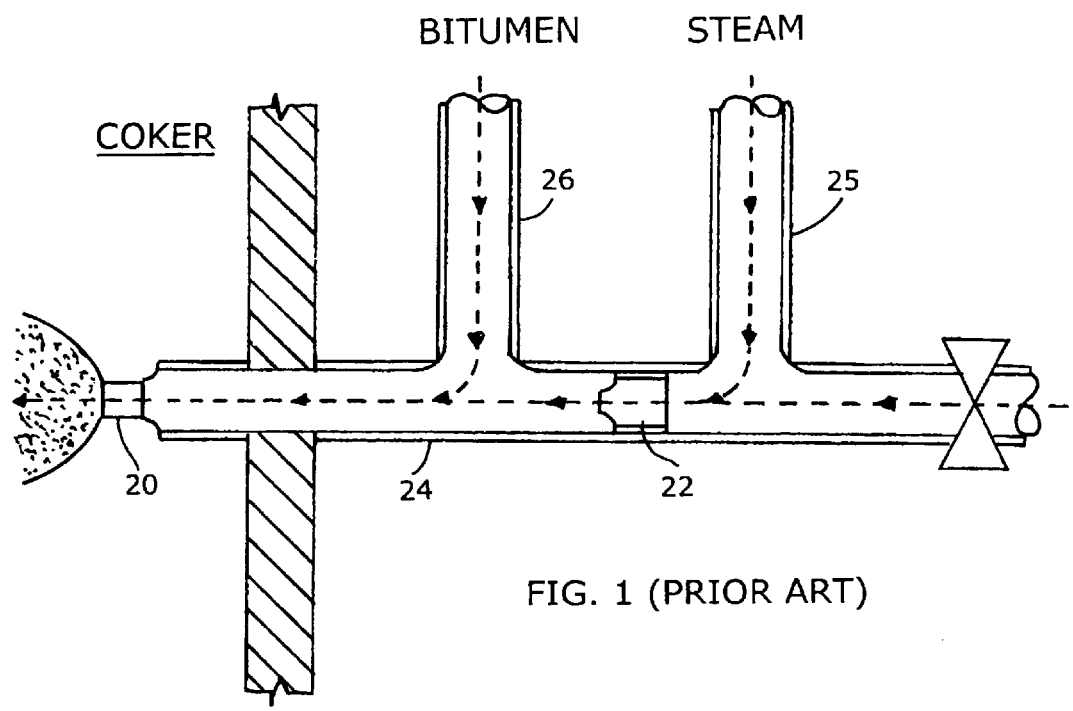
FIG. 1 represents a prior art mixing arrangement as is illustrated in U.S. Pat. No. 6,003,789.

FIG. 1 as discussed above illustrates a prior art mixing arrangement in which both the bitumen and steam conduits (26, 25) meet the main conduit 24 at right angles, the bitumen and steam conduits being generally parallel to each other.

Figure 2:
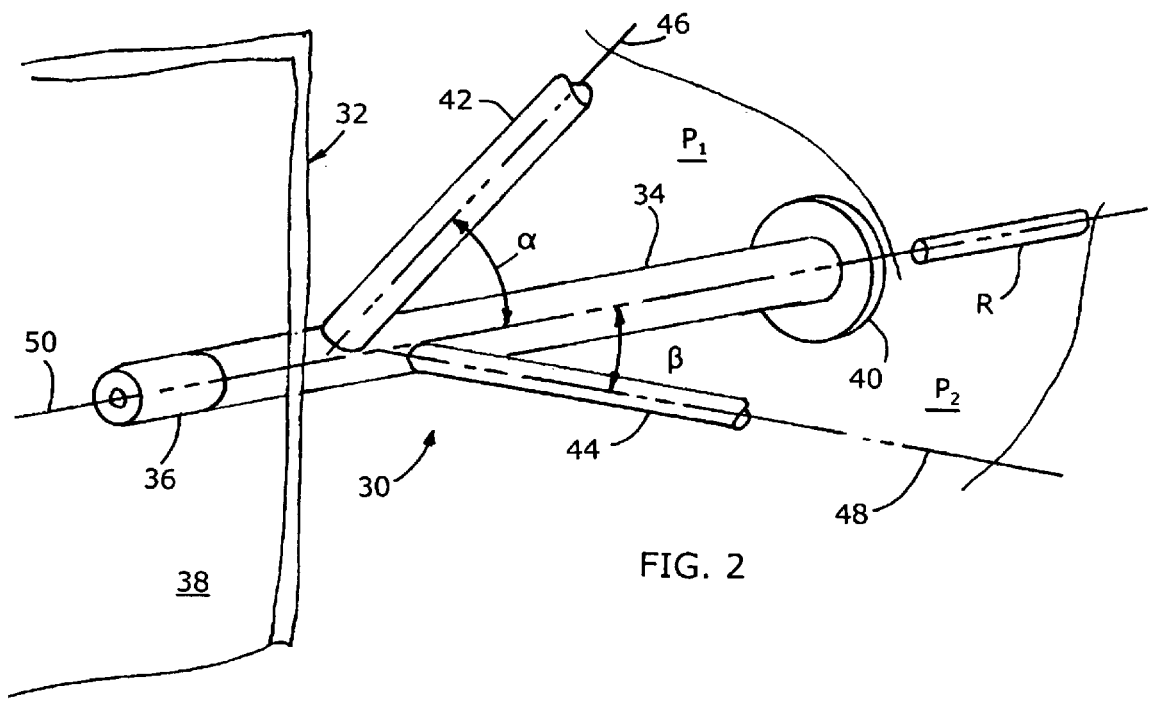
FIG. 2 is a perspective view of a mixing arrangement in accordance with the present invention.

FIG. 2 illustrates a mixing arrangement 30 in accordance with the present invention, as utilized with a reactor or coker 32. The mixing arrangement of this invention includes a main conduit 34 connected at a proximal end thereof to an atomizing nozzle 36 that is fixed in a wall 38 of the reactor. The atomizing nozzle 36 does not form a part of the present invention and can be one similar to the one disclosed in the aforementioned U.S. Pat. No. 6,003,789. At the distal end of the conduit 34 is a valve or closure member 40 which can be opened to admit a cleaning rod R, used to push any bitumen that might be clogging the conduit 34 through the conduit and the atomizing nozzle into the reactor. Normally the closure member 40 will be closed during operation of the mixing arrangement.

There are two supply or feed conduits connected to the main conduit 34, namely a first or bitumen feed conduit 42 and a second or steam feed conduit 44. Conduit 42 has a longitudinal or first axis 46 and conduit 44 has a longitudinal or second axis 48. The main conduit has its own longitudinal or main axis 50. The conduits are set out such that the main and first axes 50, 46 are in a first plane $P_1$ and the main and second axes are in a second plane $P_2$. Furthermore, as seen in the drawings the first conduit 42 intersects the main conduit 34 at an acute angle $\alpha$ defined between the main and first axes upstream of the junction between the first and main conduits, while the second conduit 44 intersects the main conduit 34 at an acute angle $\beta$ defined between the main and second axes upstream of the junction between the second and main conduits. It has been found that the angle $\alpha$ preferably will be within the range of 30° to 60° while the angle $\beta$ will be within the range of 20° to 40°. For optimum performance of the mixing arrangement of this invention the angle $\alpha$ will be about 45° and the angle $\beta$ will be about 30°.

Depending on the equipment surrounding the reactor 32 the relationship between the planes $P_1$ and $P_2$ can be set so as to minimize any interference between the conduits 34, 42 and 44 and such surrounding equipment. FIGS. 4A and 4B show two possible relationship that could be utilized, it being understood that any number of angular relationships between the planes is possible without detracting from the performance of the mixing arrangement. In FIG. 4A the planes $P_1$ and $P_2$ are shown as being coplanar, arranged on opposite sides of the conduit 34. In FIG. 4B the planes $P_1$ and $P_2$ are shown as being arranged at, generally speaking, 90° to each other.

The interior of the conduit 34 in the vicinity of the junctions of the feed conduits 42 and 44 therewith is shown in FIG. 3. There it will be seen that the second conduit 44 is provided with a flow-accelerating nozzle 52 in the form of a reduced diameter section 54 adjacent the entrance from the conduit 44 to the conduit 34. This nozzle accelerates the pressurized steam as it enters the conduit 34 so that it will be more effective in carrying bitumen from the conduit 42 towards the atomizing nozzle 36. Since the nozzle 52 is not located within the main conduit 34 the orifice size thereof is not limited physically as with the prior art arrangement and thus the orifice can be sized for optimum gas bubble production.

FIG. 3 also illustrates the dimensional relationship among the components of the present invention in the vicinity of the junctions of the feed conduits 42 and 44 with the main conduit 34. In one advantageous version of the present invention each of the main and first feed conduits has a diameter $D_1$, $D_2$ respectively of about 38 mm and the second feed conduit has a diameter $D_3$ of about 24 mm. The accelerating nozzle 52 had a diameter $D_4$ of about 10 mm. The separation S between the points on the main axis 50 intersected by the first axis 46 and the second axis 48 is about 23 mm. It can therefore be seen that the two feed conduits intersect the main conduit much closer than in the prior art arrangement and this also contributes to a more efficient operation of the mixing arrangement of the present invention. In more general terms, for scaling purposes, the diameter $D_2$ of the first feed conduit 42 should be substantially equal to the diameter $D_1$ of the main conduit 34, the diameter $D_3$ of the second feed conduit 44 should be about 60% to 65% of the diameter of the first feed conduit, and the diameter $D_4$ of the accelerating nozzle should be about 42% of the diameter of the second feed conduit. The diameter $D_4$ of the accelerating nozzle 52 should also be selected so that the mean gas velocity of the compressible fluid exiting the nozzle is at least 24.4 m/sec.

It should also be understood that the present invention is not restricted to use with bitumen and steam. It can be used in any situation in which a heavier fluid component is to be carried in and by a lighter fluid or gas component to a final location for further processing of the heavier component. The present invention could be used, for example, for the transportation of oil in water or steam if desired. The gas component (the second fluid) could be, for example, steam (as described), pentane, butane, propane, air or a mixture thereof, depending on the end use application. Some of the organic gases have been considered for coker reactor operations as the compressible gas phase since there is often an abundance of such gases at the plant site and, in fact, these gases can be used in a recycle operation that minimizes production of environmental emissions. Of importance is the fact that one phase is incompressible and that it is being dispersed by the introduction of a second, compressible, phase for conditioning the flow for atomization that is effected downstream of the zone at which the gas is mixed with the liquid.

As indicated above, the present invention does not rely on any particular nozzle tip for effective operation. The invention will work with the nozzle tip described in the previously-mentioned U.S. patent or with any other nozzle designed for atomizing multi-phase flow. The present invention will enhance the efficiency of any such nozzle, allowing for the flow to be tuned for optimal performance.

Other modifications to the present invention may present themselves to a skilled person in the art. The protection to be afforded the present invention is to be determined from the scope of the claims appended hereto.

The invention claimed is:

1. An arrangement for feeding a mixture of bitumen and steam to a reactor for further processing of atomized bitumen within the reactor comprising:

an atomizing nozzle connected to a wall of said reactor and opening to an interior of said reactor, said nozzle being adapted to atomize bitumen carried by steam into droplets suitable for such further processing;

a main conduit having a main axis, connected at a proximal end to said nozzle and including openable closure means at a distal end thereof;

a first feed conduit having a first axis and connected to a source of bitumen, said first conduit being in a first plane containing said main and first axes, said first feed conduit joining said main conduit at an angle in the range of 30° to 60° as defined between said main and first axes upstream of the junction between said main and first conduits;

a second feed conduit having a second axis and connected to a source of steam, said second conduit being in a second plane containing said main and second axes, said second feed conduit joining said main conduit upstream of the junction between said main and first conduits at an angle in the range of 20° to 40° as defined between said main and second axes upstream of the junction between said main and second conduits; and flow-accelerating nozzle means positioned in said second feed conduit upstream of the juncture between said main and second conduits.

2. The arrangement of claim 1 wherein said first and second planes are coplanar, with said first and second feed conduits being positioned on opposite sides of said main conduit.

3. The arrangement of claim 1 wherein said first and second planes are separated angularly by an angle in the vicinity of 90°.

4. The arrangement of claim 1 wherein said flow accelerating nozzle means is positioned in said second feed conduit adjacent the junction of said second feed conduit with said main conduit.

5. The arrangement of claim 1 wherein said angle between said main and first axes is about 45° and the angle between said main and second axes is about 30°.

6. The arrangement of claim 1 wherein said closure means is adapted to receive an elongated pusher rod therethrough, which rod is adapted for pushing any bitumen that might clog said main conduit through said main conduit and said atomizing nozzle into said reactor.

7. The arrangement of claim 1 wherein said main conduit has a diameter of about 38 mm, said first feed conduit has a diameter of about 38 mm, said second feed conduit has a diameter of about 24 mm, and said first axis intersects said main axis at a point about 23 mm downstream of a point at which said second axis intersects said main axis.

8. The arrangement of claim 7 wherein said flow accelerating nozzle has a minimum diameter of about 10 mm.

9. The arrangement of claim 1 wherein said main conduit has a diameter $D_1$, said first feed conduit has a diameter $D_2$, said second feed conduit has a diameter $D_3$, and wherein $D_1$ is substantially equal to $D_2$, and D3 is about 60% to 65% of $D_2$.

10. The arrangement of claim 1 wherein said flow-accelerating nozzle has a diameter selected to impart a mean gas velocity of at least 24.4 m/sec to steam exiting therefrom.

11. The arrangement of claim 9 wherein said flow-accelerating nozzle has a diameter $D_4$ which is about 42% of the diameter $D_3$ and wherein said diameter $D_4$ is also selected to impart a mean gas velocity of at least 24.4 m/sec to steam exiting therefrom.

12. The arrangement of claim 1 wherein said closure means is adapted to be opened for insertion of conduit cleaning means into said main conduit.

13. A mixing arrangement for feeding a mixture of oil and steam to an atomizing nozzle connected to a reactor for further processing therein, comprising:

a main conduit having a main axis, for connection at a proximal end to said nozzle and including openable closure means at a distal end thereof;

a first feed conduit having a first axis and connected to a source of oil, said first conduit being in a first plane containing said main and first axes, said first feed conduit joining said main conduit at an angle in the range of 30° to 60° as defined between said main and first axes upstream of the junction between said main and first conduits;

a second feed conduit having a second axis and connected to a source of steam, said second conduit being in a second plane containing said main and second axes, said second feed conduit joining said main conduit upstream of the junction between said main and first conduits at an angle in the range of 20° to 40° as defined between said main and second axes upstream of the junction between said main and second conduits; and flow-accelerating nozzle means positioned in said second feed conduit upstream of the juncture between said main and second conduits.

14. The arrangement of claim 13 wherein said closure means is adapted to be opened for insertion of conduit cleaning means into said main conduit.

15. A mixing arrangement for feeding a mixture of a heavier, generally incompressible, fluid and a lighter, compressible, fluid to a location for further processing therein, comprising:

a main conduit having a main axis, for connection at a proximal end to processing apparatus at said location;

a first feed conduit having a first axis and connected to a source of said heavier fluid, said first conduit being in a first plane containing said main and first axes, said first feed conduit joining said main conduit at an angle in the range of 30° to 60° as defined between said main and first axes upstream of the junction between said main and first conduits;

a second feed conduit having a second axis and connected to a source of said lighter fluid, said second conduit being in a second plane containing said main and second axes, said second feed conduit joining said main conduit upstream of the junction between said main and first conduits at an angle in the range of 20° to 40° as defined between said main and second axes upstream of the junction between said main and second conduits; and flow-accelerating nozzle means positioned in said second feed conduit upstream of the juncture between said main and second conduits.

16. The arrangement of claim 15 wherein said main conduit includes closure means at a distal end thereof, adapted to close said main conduit at said distal end and to open said main conduit for insertion of conduit cleaning means into said main conduit.

17. The arrangement of claim 15 wherein said main conduit has a diameter $D_1$, said first feed conduit has a diameter $D_2$, said second feed conduit has a diameter $D_3$, and wherein $D_1$ is substantially equal to $D_2$, and D3 is about 60% to 65% of $D_2$.

18. The arrangement of claim 15 wherein said flow-accelerating nozzle has a diameter selected to impart a mean gas velocity of at least 24.4 m/sec to lighter fluid exiting therefrom.

19. The arrangement of claim 17 wherein said flow-accelerating nozzle has a diameter $D_4$ which is about 42% of the diameter $D_3$ and wherein said diameter $D_4$ is also selected to impart a mean gas velocity of at least 24.4 m/sec to lighter fluid exiting therefrom.

* * * * *